United States Patent [19]
Christensen et al.

[11] 3,749,336
[45] July 31, 1973

[54] AIRCRAFT ANTI-ICING APPARATUS

[75] Inventors: Eric A. Christensen, Columbus; Robert W. Schilling, Grove City, both of Ohio

[73] Assignee: Midland-Ross Corporation, Cleveland, Ohio

[22] Filed: Mar. 10, 1972

[21] Appl. No.: 233,573

Related U.S. Application Data

[63] Continuation-in-part of Ser. No. 885,503, Dec. 16, 1969, abandoned.

[52] U.S. Cl. ............................................. 244/134 B
[51] Int. Cl. ............................................. B64d 15/04
[58] Field of Search ................... 244/134 R, 134 B, 244/134 C

[56] References Cited
UNITED STATES PATENTS
3,258,229  6/1966  Larson ........................... 244/134 R
3,058,695  10/1962  Simonis ........................... 244/134 R OTHER PUBLICATIONS
"Flight" Vol. 54, Aug. 26, 1948, pg. 239

Primary Examiner—Duane A. Reger
Assistant Examiner—Gregory W. O'Connor
Attorney—Paul M. Craig, Jr., Charles E. Wands et al.

[57] ABSTRACT

Anti-icing/de-icing apparatus for use in aircraft, comprising apertured fairings constructed from aluminum or alloys thereof defining air spaces therewithin, and means for delivering temperature controlled warm air under pressure to said air spaces, which means includes a conduit for conveying engine bleed air to said air spaces, an inlet to the conduit for cool ambient air to be mixed with the relatively warm engine bleed air, an anti-icing valve interposed in the conduit between the engine bleed air intake and the ambient air inlet and control means for regulating the valve to maintain the pressure and temperature of the air delivered to the air spaces below predetermined nominal values, said control means including pressure-responsive means and manually-controlled electrical means for overriding the pressure-responsive means. Additionally, the present invention contemplates an emergency relief valve disposed in the conduit downstream of the ambient air inlet and adapted to open in the event that the pressure or temperature of the air passing thereby is of greater than a predetermined maximum value.

13 Claims, 2 Drawing Figures

3,749,336

AIRCRAFT ANTI-ICING APPARATUS

This is a continuation-in-part of my copending application Ser. No. 885,503, filed Dec. 16, 1969, now abandoned.

BACKGROUND OF THE INVENTION

For some time, anti-icing apparatus employed in aircraft for preventing the formation of ice on faired surfaces has utilized relatively warm engine bleed air and conduits for delivering this heated air, under pressure, to air spaces defined by apertured fairings. With the ever-increasing demand for greater engine performance, the conventional engine bleed air systems are distributing air at correspondingly greater temperatures and pressures.

Of course, the increase in engine performance cannot be effectively realized unless the overall weight of the aircraft can be maintained at minimal levels. In view of the extremely high temperature and pressure of engine bleed air, however, it has been necessary to construct the apertured fairings from materials such as steel, which can withstand the excessive temperature and pressure. The use of steel, however, for the construction of engine inlet fairings and the like, rather than lighter aluminum and aluminum alloys, has tended to increase the overall aircraft weight, thus detrimentally affecting the aircraft performance.

Thus, it is an object of the present invention to provide anti-icing apparatus utilizing the heated engine bleed air which can safely be employed in conjunction with apertured fairings constructed from aluminum or aluminum alloys.

Further, it is an object of the present invention to provide anti-icing apparatus of the type described hereinabove which utilizes relatively cool ambient air in conjunction with the relatively warm engine bleed air to maintain the pressure and temperature of the air delivered to the faired surfaces within limits permitting the safe use of aluminum or aluminum alloys for the construction of the fairings.

It is still another object of the present invention to provide anti-icing apparatus of the type described above including a control system adapted to automatically regulate the flow of engine bleed air automatically in response to the pressure in the conduit upstream of the cool ambient air intake.

Still another object of the present invention resides in the provision of a pilot-controlled override for selectively closing the conduit to restrict the flow therethrough of engine bleed air.

Another object of the present invention resides in the provision of anti-icing apparatus of the type generally described hereinabove which further includes an emergency relief valve disposed in the conduit downstream of the ambient air intake to divert the flow of air of greater temperature and/or pressure than predetermined maximum values thereof, thus preventing damage to the fairings constructed from aluminum or alloys thereof.

Finally, it is an object of the present invention to provide anti-icing apparatus of the type described above which is simple in its construction and does not unduly increase the overall weight of the aircraft.

SUMMARY OF THE INVENTION

The foregoing objects are accomplished, in accordance with the present invention, by the provision of a conduit having an inlet for engine bleed air, a second inlet for cool ambient air and an outlet to air distributing spaces defined by apertured fairings preferably constructed from aluminum or alloys thereof. A valve, preferably of the common butterfly type, is disposed within the conduit between the engine bleed air intake and the ambient air inlet so as to be operable to selectively restrict the flow of engine bleed air to the outlet of the conduit.

An actuator is provided for selectively positioning the butterfly valve in response to a pressure signal from one of two alternate sources. The first of these sources is a control device automatically responsive to the pressure sensed in the conduit downstream of the butterfly valve and upstream of the ambient air intake. The second of the two alternate sources is a pilot-operated control device, preferably of the solenoid valve type, arranged so as to produce a pressure signal sufficient to cause the actuator to move the butterfly valve to a closed position irrespective of the condition of the pressure-responsive control device.

The present invention further contemplates a provision of an ejector nozzle within the conduit at the location of the ambient air intake to produce a pumping effect, thus providing for effective mixing of the heated engine bleed air with the cool ambient air. Finally, an emergency relief valve is disposed within the conduit, downstream of the ambient air intake, adapted to open in case the air flow thereby is at a pressure and/or temperature in excess of predetermined maximum values, thus precluding damage of the fairings constructed from aluminum or alloys thereof. The emergency relief valve is adapted to lock in the open position and provide an indication of its open condition, thus signalling the pilot and alerting him to a malfunction of the control device.

BRIEF DESCRIPTION OF THE DRAWING

The foregoing objects, features and advantages of the present invention will become more readily apparent from the detailed description hereinbelow, when considered in conjunction with the accompanying drawing.

DETAILED DESCRIPTION OF THE DRAWING

Figure 1:
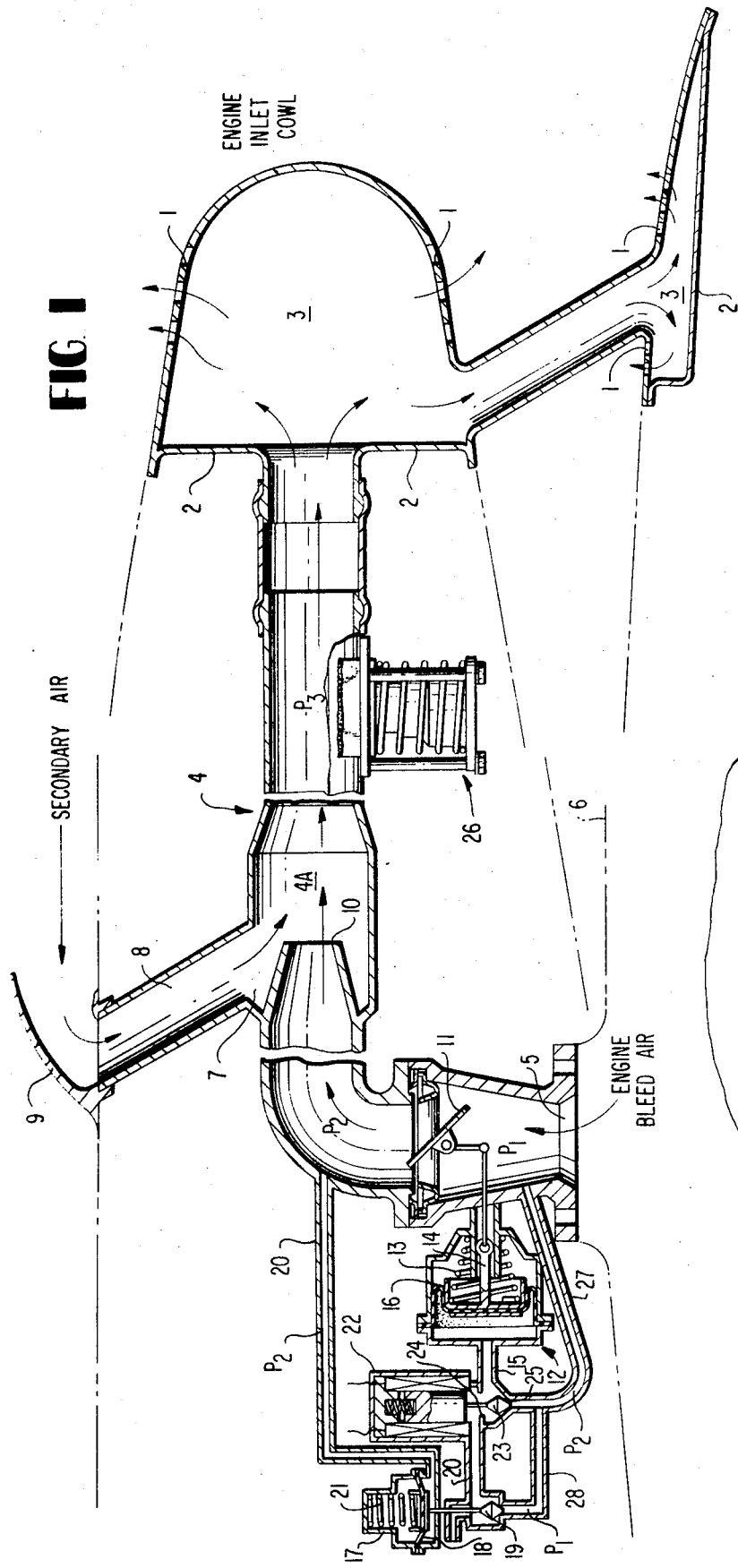
FIG. 1 is a schematic representation of the anti-icing apparatus and the control system therefor.

FIG. 1 is a schematic representation of a partial cross-sectional view of the inlet portion of a conventional jet aircraft engine, incorporating the anti-icing apparatus contemplated by the present invention. For preventing the formation of ice on the faired surfaces of the engine inlet, apertured fairings 1 are provided. The apertured fairings 1 are preferably constructed from aluminum or a similarly light-weight alloy thereof. Fairings 1, together with sheet metal members 2, which may also be constructed of aluminum or another light-weight metal, define therebetween air distributing spaces 3.

A conduit generally designated by reference numeral 4 is provided for conveying warm air to air distributing spaces 3. Conduit 4 includes an engine bleed air inlet 5 wherein heated air is withdrawn from the engine 6. Additionally, conduit 4 includes an inlet for cool ambient air 7 at the inner end of a channel 8 which leads to an outer surface of the engine. At this outer surface, an air scoop 9 is disposed so as to deflect cool ambient air through channel 8 and inlet 7 into conduit 4.

In the region of inlet 7, an ejector nozzle 10 is provided, which serves as a pump. The mixing chamber (4A) effects a thorough and intimate mixing of the engine bleed air and secondary or ambient air.

A selectively-operable butterfly-type closure valve 11 is disposed within conduit 4 between engine bleed air inlet 5 and secondary air inlet 7. An actuator 12 is provided for effecting rotation of valve 11.

Actuator 12 includes a spring 13 normally biasing plunger 14 rearward (to the left, as viewed in the drawing), thus normally tending to maintain valve 11 in an open position. From the opposite direction, plunger 14 may be acted upon, through diaphragm 16, by the pressure in channel 15.

An automatic pressure-responsive control device 17 includes a diaphragm 18 connected with a valve body 19. Diaphragm 18 is exposed, on one side thereof, to the pressure $P_2$ sensed downstream of valve 11 and upstream of ejector nozzle 10 and transmitted to diaphragm 18 by means of a channel 20. The opposite side of diaphragm 18 is acted upon by a spring 21, the force of which is selected so as to yield when $P_2$ reaches a magnitude in excess of a predetermined nominal level.

A solenoid-controlled valve 22 is arranged in communicating relationship with one side of diaphragm 16. The valve 22 includes a valve body 23 movable between two seating positions 24 and 25. Under normal circumstances, with the solenoid de-energized, valve body 23 assumes the position illustrated, seated at valve seat 25. By activating a switch (not shown) provided, however, the pilot can cause the solenoid to be energized, causes valve body 23 to seat at valve seat 24.

Figure 2:
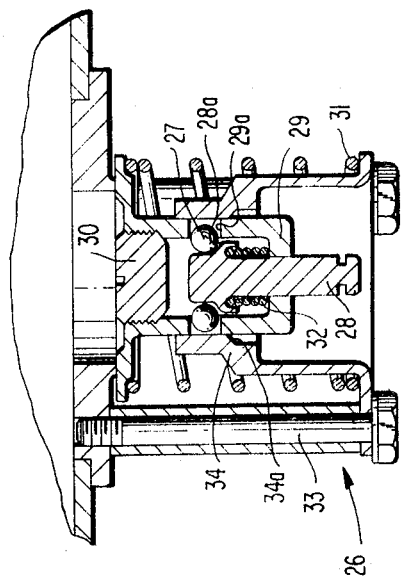
FIG. 2 is a detail sectional view of a relief valve used in the apparatus of FIG. 1.

A normally closed emergency relief valve 26 is provided in conduit 4 downstream of ambient air inlet 7 where mixing of the engine bleed air and the secondary air takes place. As seen in FIG. 2, the relief valve 26, which may be of the poppet type, includes a poppet member 29 having a generally hat-shaped configuration including a relatively flat end portion closed by a setscrew 30 which serves as the closure for the opening in conduit 4. The poppet 29 is supported for movement against the bias of a spring 31 within a guide member 34 which is secured to the conduit 4 by means of a plurality of bolts 33.

The poppet member 29 is provided with a plurality of holes, preferably three holes, 29a in each of which a ball 27 is positioned. Each ball 27 is held in position by the inner surface of the guide member 34 and the surface of a resetting pin located within the guide member and having an operating end extending to the outside of the poppet member. The upper end of the resetting pin 28 has a cam surface 28a which is curved so as to bias the balls outwardly as the resetting pin is biased upwardly by the force of spring 32. Thus, when the pressure $P_3$ of the air flowing in the conduit exceeds a predetermined maximum, the poppet member 29 will be forced downwardly against the bias of spring 31 and the balls 27 will be translated to a position opposite a shoulder 34a on guide member 34 where they can move outwardly in response to the urging of the cam surface 28a and thereby lock the poppet in the open position. Once the balls 27 are moved outwardly under shoulder 34a, the resetting pin will be allowed to moved upwardly in response to spring 32 past the balls 27 until it is stopped by the setscrew 30. This blocks the holes 29a and prevents the balls 27 from moving back inwardly, which the shoulder 34a will have a tendency to do.

By having the relief valve 26 lock open, this serves as an indication that the control arrangement may have malfunctioned. To reset the relief valve one need only pull downwardly on the operating end of the resetting pin 28 against the bias of spring 32 to reposition the cam surface 28a adjacent the openings 29a, at which point the balls 27 will be biased inwardly by the shoulder 34a and the force of spring 31, thereby unlocking the valve.

The operation of the illustrated apparatus is as follows: under normal operating conditions, with the pressure $P_2$ not exceeding a predetermined nominal level, valve body 19 remains seated in the position shown by virtue of the force of spring 21. Thus, with the solenoid valve 22 de-energized, and valve body 23 seated, in the position illustrated, at valve seat 25, no pressure is exerted upon diaphragm 16 to oppose the force of spring 13 and valve 11 remains open.

If, however, the pressure $P_2$ rises to a level exceeding the predetermined nominal level, then this pressure, transmitted via channel 20, to one side of diaphragm 18, causes the diaphragm 18 to move despite the force of spring 21 acting in opposition thereto. Thus, valve body 19 will become unseated and the pressure $P_1$, sensed at a position upstream of valve 11 and transmitted through channels 27, 28, 29 and 15, will be exerted upon diaphragm 16 in opposition to the force exerted by spring 13. Depending upon the magnitude of pressure $P_1$ and the force of spring 13, valve 11 may then be rotated to restrict, either partially or totally, the flow of engine bleed air through conduit 4. With the flow of bleed air thus restricted, the pressure $P_2$ should then stabilize, causing valve body 19 seek a position to maintain the necessary $P_1$ pressure on diaphragm 16 to stabilize valve 11 in the required position.

Independent of the relative pressure levels, solenoid valve 22 may be energized by a switch provided, thus causing valve body 23 to be seated at valve seat 24 rather than valve seat 25. Under such circumstances, the pressure $P_1$ will be exerted upon diaphragm 16 via channels 27 and 15, thus causing valve 11 to be rotated into a closed position assuming that the pressure $P_1$ exerted upon diaphragm 16 exceeds the force of spring 13.

Thus, it can clearly be seen that the present invention, utilizing cool ambient air and effecting an intimate mixing thereof with relatively warm engine bleed air, in combination with the novel control system contemplated, effectively limits the maximum pressure and temperature of air delivered to the air distributing spaces 3. This facilitates the construction of fairings 1 from aluminum or other light-weight alloys, thus advantageously limiting the overall weight of the aircraft.

While the present invention has been disclosed with reference to but a single embodiment, it is to be understood that the scope of the invention is not limited to the details thereof, but is susceptible of numerous changes and modifications as would be apparent to one with normal skill in the pertinent technology.

What is claimed is

1. Anti-icing apparatus for use in aircraft, comprising:

apertured fairing means constructed from relatively light-weight materials, said fairing means defining air distribution spaces therewithin, conduit means including first inlet means communicating with the aircraft engine for passage of engine bleed air there-through, second inlet means disposed downstream of selectively operable valve means and communicating with an exterior surface of the aircraft for passage of ambient air therethrough, and outlet means communicating with said air distribution spaces for delivery of air thereto, said selectively-operable valve means being disposed within said conduit means between said first inlet means and said second inlet means, control means responsive to the pressure within said conduit means upstream of said second inlet means and including actuating means for actuating said valve means to selectively restrict the flow of said engine bleed air in response to the pressure within said conduit means upstream of said valve means, and emergency relief valve means disposed in said conduit means donwstream of said second inlet means for preventing air flow to said air distribution spaces at pressure levels in excess of predetermined maximum levels.

2. Anti-icing apparatus according to claim 1, wherein said emergency relief valve means is disposed between said second inlet means and said outlet means, said relief valve means being of the normally-closed type.

3. Anti-icing apparatus according to claim 2, wherein said emergency relief valve means includes means for locking said valve means in the open position thereby indicating the open position of said valve means.

4. Anti-icing apparatus for use in aircraft, comprising:

apertured fairing means constructed from relatively light-weight materials, said fairing means defining air distribution spaces therewithin, conduit means including first inlet means communicating with the aircraft engine for passage of engine bleed air therethrough, second inlet means disposed downstream of selectively operable valve means and communicating with an exterior surface of the aircraft for passage of ambient air therethrough, and outlet means communicating with said air distribution spaces for delivery of air thereto, said selectively-operable valve means being disposed within said conduit means between said first inlet means and said second inlet means, control means responsive to the pressure within said conduit means upstream of said second inlet means and including actuating means for actuating said valve means to selectively restrict the flow of said engine bleed air in response to the pressure within said conduit means upstream of said valve means, and wherein said control means further includes selectively energizable solenoid valve means, said solenoid valve means being operable, when energized, to cause said actuating means to actuate said first-mentioned valve means to restrict the flow of said engine bleed air.

5. Anti-icing apparatus according to claim 4, further comprising emergency relief valve means disposed in said conduit means downstream of said second inlet means for preventing air flow to said air distribution spaces at temperature and pressure levels in excess of predetermined maximum levels.

6. Anti-icing apparatus for use in aircraft, comprising:

apertured fairing means constructed from relatively light-weight materials, said fairing means defining air distribution spaces therewithin, conduit means including first inlet means communicating with the aircraft engine for passage of engine bleed air therethrough, second inlet means disposed downstream of selectively operable valve means and communicating with an exterior surface of the aircraft for passage of ambient air therethrough, and outlet means communicating with said air distribution spaces for delivery of air thereto, said selectively-operable valve means being disposed within said conduit means between said first inlet means and said second inlet means, control means responsive to the pressure within said conduit means upstream of said second inlet means and including actuating means for actuating said valve means to selectively restrict the flow of said engine bleed air in response to the pressure within said conduit means upstream of said valve means, and wherein said control means further includes pressure-responsive valve means operable to communicate a pressure signal to said actuating means to cause same to actuate said first-mentioned valve means to restrict the flow of engine bleed air when the pressure sensed within said conduit means at a point between said valve means and said second inlet means reaches a level in excess of a predetermined nominal value.

7. Anti-icing apparatus according to claim 6, wherein said pressure-responsive valve means includes diaphragm means exposed, on one side thereof, to the sensed pressure in said conduit means between said first-mentioned valve means and said second inlet means and, on the other side, to a spring means exerting a force of predetermined magnitude.

8. Anti-icing apparatus according to claim 7, wherein said actuating means includes a diaphragm means exposed, on one side thereof, to a pressure signal selectively transmitted by said pressure-responsive valve means and, on the other side thereof, to a spring means exerting a force of a predetermined magnitude, which force tends to cause said first-mentioned valve means to permit free flow of engine bleed air in the absence of an opposed balancing pressure signal exerted upon said diaphragm means.

9. Anti-icing apparatus according to claim 8, wherein said control means further includes pressure channel means operatively connecting said conduit means, at a point upstream of said first-mentioned valve means, with one side of said diaphragm means of said actuating means, said pressure-responsive valve means being operable to selectively block said pressure channel means when said sensed pressure in said conduit means at a point between said valve means and said second inlet means is of lesser magnitude than said predetermined nominal value.

10. Anti-icing apparatus according to claim 9, wherein said control means further includes selectively energizable solenoid valve means operable, when deenergized, to block parallel pressure channel means operatively connecting said conduit means, at a point upstream of said first-mentioned valve means, with said one side of said diaphragm means of said actuating means and to open said parallel pressure channel means when said solenoid valve means is energized, irrespective of the condition of said pressure-responsive valve means.

11. Anti-icing apparatus according to claim 10, wherein said apertured fairing means are constructed from aluminum or alloys thereof.

12. Anti-icing apparatus according to claim 10, further comprising emergency relief valve means disposed between said conduit means, at a point downstream of said second inlet means, and said outlet means, said relief valve means being normally-closed, but operable to open when the air flow thereby is at pressure levels in excess of predetermined maximum values, thus precluding air flow to said air distribution spaces which might be destructive of said fairing means.

13. Anti-icing apparatus according to claim 12, wherein said emergency relief valve means includes means for locking said valve means in the open position thereby indicating the open position of said valve means.

* * * * *